US012174960B1

(12) United States Patent
Shen

(10) Patent No.: US 12,174,960 B1
(45) Date of Patent: Dec. 24, 2024

(54) SYSTEMS AND METHODS FOR IDENTIFYING AND REMEDIATING SECURITY THREATS AGAINST GRAPH NEURAL NETWORK MODELS

(71) Applicant: GEN DIGITAL INC., Tempe, AZ (US)

(72) Inventor: Yun Shen, Bristol (GB)

(73) Assignee: GEN DIGITAL INC., Tempe, AZ (US)

( * ) Notice: Subject to any disclaimer, the term of this patent is extended or adjusted under 35 U.S.C. 154(b) by 415 days.

(21) Appl. No.: 17/653,420

(22) Filed: Mar. 3, 2022

(51) Int. Cl.
*G06F 21/56* (2013.01)
*G06N 3/045* (2023.01)

(52) U.S. Cl.
CPC ........... *G06F 21/566* (2013.01); *G06N 3/045* (2023.01); *G06F 2221/033* (2013.01)

(58) Field of Classification Search
CPC .... G06F 21/56; G06F 2221/033; G06N 3/045
USPC .......................................................... 726/23
See application file for complete search history.

(56) References Cited

U.S. PATENT DOCUMENTS

2022/0207351 A1* 6/2022 Sarkar ..................... G06N 3/042
2023/0206029 A1* 6/2023 Qiao ....................... G06N 3/042
706/25

OTHER PUBLICATIONS

Chen et al., "A Survey of Adversarial Learning on Graph", Journal of the ACM, vol. 37, No. 4, Article 111, Aug. 2018, pp. 1-28.
Xu et al., "Adversarial Attacks and Defenses in Images", International Journal of Automation and Computing, Graphs and Text: A Review, vol. 17, No. 2, Apr. 2020, pp. 151-178.
Goyal et al., "Graph Embedding Techniques, Applications, and Performance: A Survey", URL: arxiv.org/pdf/1705.02801.pdf, Dec. 22, 2017, pp. 1-19.
Dai et al., "Adversarial Attack on Graph Structured Data", URL: arxiv.org/pdf/1806.02371.pdf, Jun. 6, 2018, 10 pages.
Lee et al., "Attention Models in Graphs: A Survey", ACM Transactions on Knowledge Discovery from Data, Aug. 2018, pp. 1-19.
Zhang et al., "Deep Learning on Graphs: A Survey", Journal of Latex Class Files, vol. 14, No. 8, Aug. 2015, pp. 1-24.
Zhou et al., "Graph neural networks: A review of methods and applications", URL: www.keaipublishing.com/en/journals/ai-open, ScienceDirect, AI Open 1, 2020, pp. 57-81.

(Continued)

*Primary Examiner* — Lan Dai T Truong
(74) *Attorney, Agent, or Firm* — Greenberg Traurig, LLP

(57) ABSTRACT

The disclosed computer-implemented method for identifying and remediating security threats against graph neural network models may include (i) analyzing an input format for model data utilized by a graph neural network (GNN) model on a target computing system, (ii) generating probing data corresponding to the input format, (iii) querying the GNN model utilizing the probing data, (iv) building, based on a query response output of the GNN model utilizing the probing data, one or more shadow GNN models, (v) verifying a performance metric of the shadow GNN models against a target performance metric associated with the GNN model, and (vi) performing a security action that protects against a potential security threat against the GNN model when the performance metric of the shadow GNN models is similar to target performance metric associated with the GNN model. Various other methods, systems, and computer-readable media are also disclosed.

20 Claims, 7 Drawing Sheets

(56) References Cited

OTHER PUBLICATIONS

Sun et al., "Adversarial Attack and Defense on Graph Data: A Survey", URL: arxiv.org/pdf/1812.10528.pdf, Jul. 14, 2020, pp. 1-18.
Wu et al., "A Comprehensive Survey on Graph Neural Networks", URL: arxiv.org/pdf/1901.00596.pdf, Journal of Latex Class Files, Aug. 2019, pp. 1-22.
Jin et al., "Adversarial Attacks and Defenses on Graphs: A Review, A Tool and Empirical Studies", URL: arxiv.org/pdf/2003.00653.pdf, Dec. 12, 2020, 16 pages.

* cited by examiner

SYSTEMS AND METHODS FOR IDENTIFYING AND REMEDIATING SECURITY THREATS AGAINST GRAPH NEURAL NETWORK MODELS

BACKGROUND

Many network service providers such as social and transaction networks (e.g., banking, logistics, employment, bioinformatics, etc.), utilize real-world data in the form of graphs. Graph neural networks (GNN) are a family of machine-learning models that may often be utilized by entities providing social and transaction network services to leverage graph data (e.g., transaction data, social network data etc.) for building a variety of applications such as fraud detection, sybil detection, etc.

Conventionally, the deployment of GNN models, often allow third-party external access to model data. This external access may be exploited by malicious actors who may initiate theft attacks on GNN models to rebrand and/or resell network services utilizing these models.

SUMMARY

As will be described in greater detail below, the present disclosure describes various systems and methods for identifying and remediating security threats against graph neural network models.

In one example, a method for identifying and remediating security threats against graph neural network models may include (i) analyzing, by the one or more computing devices, an input format for model data utilized by a graph neural network (GNN) model on a target computing system, (ii) generating, by the one or more computing devices, probing data corresponding to input format for the model data, (iii) querying, by the one or more computing devices, the GNN model on the target computing system utilizing the probing data, (iv) building, by the one or more computing devices and based on a query response output of the GNN model utilizing the probing data, one or more shadow GNN models, (v) verifying, by the one or more computing devices, a performance metric of the shadow GNN models against a target performance metric associated with the GNN model on the target computing system, and (vi) performing, by the one or more computing devices, a security action that protects against a potential security threat against the GNN model on the target computing system when the performance metric of the shadow GNN models is similar to target performance metric associated with the GNN model.

In some examples, the input format for the model data may be analyzed by (i) registering as a user of the target computing system, (ii) receiving a data request from the target computing system for the model data, and (iii) capturing a format of the data request. In some embodiments, the probing data may be generated by (i) identifying one or more datasets in a data category utilized by the GNN model and (ii) retrieving the identified datasets as the probing data.

In some examples, the GNN model may be queried by (i) utilizing an application programming interface (API) to retrieve a query graph comprising structural information associated with the GNN model on the target computing system and (ii) querying each of a group of nodes in the query graph utilizing the probing data. Alternatively, the GNN model may be queried by (i) retrieving unstructured graph node data utilized by the GNN model on the target computing system, (ii) building, based at least in part on the unstructured graph node data, a query graph comprising structural information associated with the GNN model, and (iii) querying each of a group of nodes in the query graph utilizing the probing data.

In some embodiments, the shadow GNN models may be constructed (i.e., built) by (i) learning one or more surrogate GNN models from the query response output of the GNN model and (ii) identifying the surrogate GNN models as the shadow GNN models. IN some examples, the performance metric of the shadow GNN models may be verified against the target performance metric associated with the GNN model on the target computing system by (i) retrieving a validation dataset associated with the target performance metric, (ii) utilizing the validation dataset to perform an attack for evaluating the GNN model and the shadow GNN models, (iii) comparing, based on the attack, a behavior of the GNN model against a behavior of the shadow GNN models, and (iv) assigning a score to the shadow GNN models based on the comparison, where the score is based on a similarity of the behavior of the shadow GNN models to the GNN model. In some examples, the score may be represented as a set of normalized values representing an accuracy and a fidelity of the attack for evaluating the GNN model and the shadow GNN models.

In some embodiments, the security action may include adding random noise to a vector representing the query response output of the GNN model to degrade the performance metric of the shadow GNN models below a level associated with the target performance metric. Additionally or alternatively, the security action may include sending a notification of the potential security threat to the target computing system.

In one embodiment, a system for verifying social media accounts to prevent identity-based attacks on social media platforms may include at least one physical processor and physical memory comprising computer-executable instructions and a set of modules that, when executed by the physical processor, cause the physical processor to (i) analyze, by an analysis module, an input format for model data utilized by a graph neural network (GNN) model on a target computing system, (ii) generate, by a probing module, probing data corresponding to input format for the model data, (iii) query, by a query module, the GNN model on the target computing system utilizing the probing data, (iv) build, by a shadow model module and based on a query response output of the GNN model utilizing the probing data, one or more shadow GNN models, (v) verify, by a verification module, a performance metric of the shadow GNN models against a target performance metric associated with the GNN model on the target computing system, and (vi) perform, by a security module, a security action that protects against a potential security threat against the GNN model on the target computing system when the performance metric of the shadow GNN models is similar to target performance metric associated with the GNN model.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) analyze an input format for model data utilized by a graph neural network (GNN) model on a target computing system, (ii) generate probing data corresponding to input format for the model data, (iii) query the GNN model on the target computing system utilizing the probing data, (iv) build, based on a query response output of the GNN model utilizing the probing data, one or more shadow GNN models, (v) verify a performance metric of the shadow GNN models against a target performance metric associated with the GNN model on the target computing system, and (vi) perform a security action that protects against a potential security threat against the GNN model on the target computing system when the performance metric of the shadow GNN models is similar to target performance metric associated with the GNN model.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the present disclosure.

Figure 1:
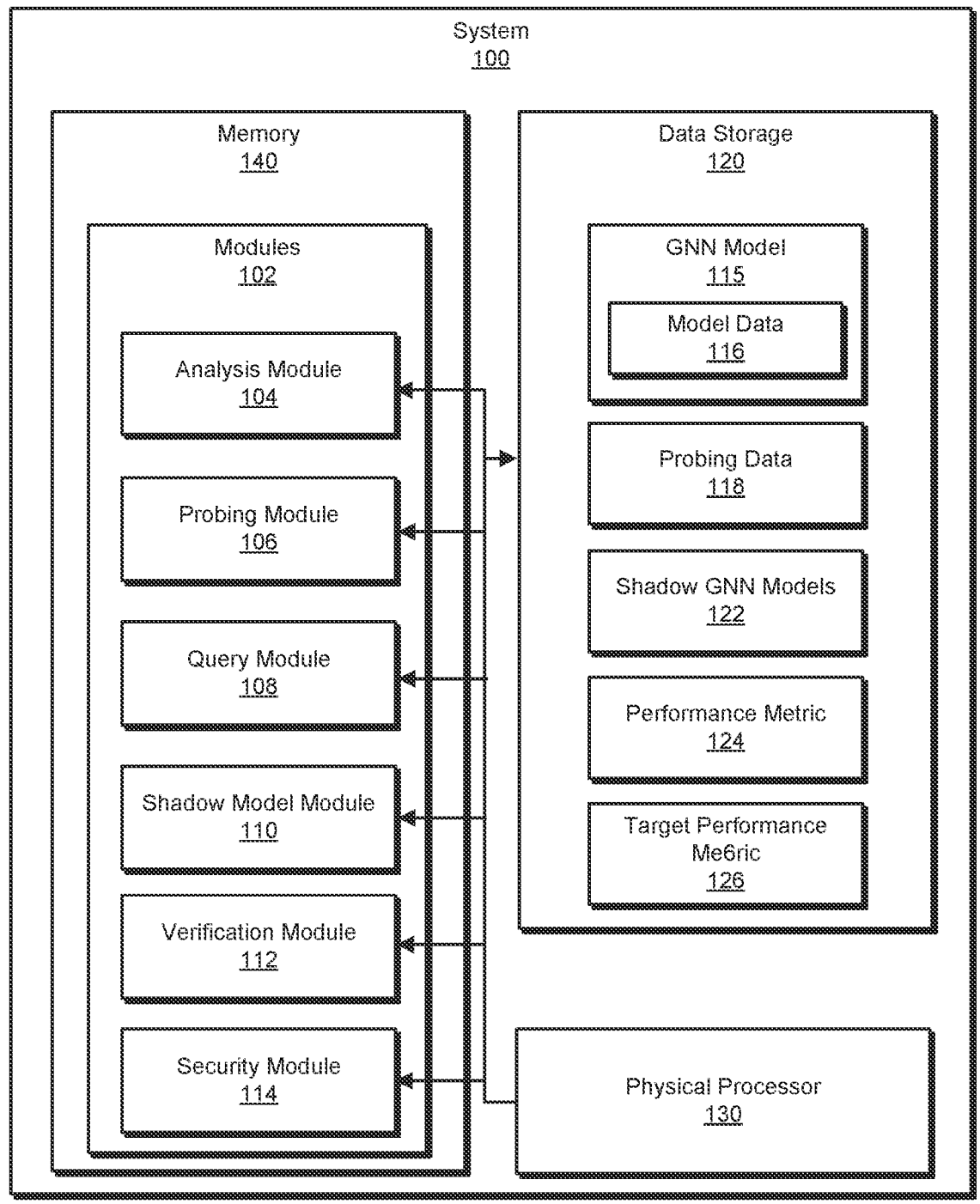
FIG. 1 is a block diagram of an example system for identifying and remediating security threats against graph neural network models.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE EMBODIMENTS

The present disclosure is generally directed to systems and methods for identifying and remediating security threats against graph neural network models. As will be described in greater detail below, the systems and methods described herein may function to perform penetration testing of services (i.e., social media network services, transactional data services, etc.) utilizing Graph Neural Networks (GNNs) to identify potential security threats. These potential security threats may include, for example, malicious actors accessing external public data to build duplicate (and thereby effectively steal) legitimate GNN models for impersonating social media network and/or transactional data GNN services. The systems and methods described herein may perform penetration testing of GNN services by actively probing targeted legitimate GNN services via a publicly accessible application programming interface (API) and building a local shadow GNN model that is intended to behave as the GNN model utilized by the targeted services. By building shadow GNN models in this way, the systems and methods described herein may verify a shadow GNN model against a target GNN model for accuracy and fidelity (i.e., closeness) with respect to model behavior and, upon determining that the shadow model behaves closely with a target model, generate a notification for the owner of the target model identifying their model as vulnerable to attack (i.e., copied). Additionally, the systems and methods described herein may perform remediation of shadow model-based GNN service attacks by adding random noise to a GNN model vector to degrade the performance of shadow GNN models.

In addition, the systems and methods described herein may improve the field of computing device security by preventing malicious attacks (e.g., unauthorized service impersonation/rebranding, model theft) against enterprise owners and operators of network service providers utilizing GNN models by identifying potential security threats and providing remediation actions against stolen models by degrading their performance.

The following will provide, with reference to FIGS. 1-2 and 4-5, detailed descriptions of example systems for identifying and remediating security threats against graph neural network models. Detailed descriptions of corresponding computer-implemented methods will also be provided in connection with FIG. 3. In addition, detailed descriptions of an example computing system and network architecture capable of implementing one or more of the embodiments described herein will be provided in connection with FIGS. 6 and 7, respectively.

FIG. 1 is a block diagram of an example system 100 for identifying and remediating security threats against graph neural network models. As illustrated in this figure, example system 100 may include one or more modules 102 for performing one or more tasks. For example, and as will be explained in greater detail below, example system 100 may include an analysis module 104 that analyzes an input format for model data 116 utilized by a GNN model 115 on a target computing system. Example system 100 may additionally include a probing module 106 that generates probing data 118 corresponding to the input format for model data 116. Example system 100 may also include a query module 108 that queries GNN model 115 utilizing probing data 118. Example system 100 may additionally include a shadow model module 110 that builds shadow GNN models 122 based on a query response output of GNN model 115. Example system 100 may also include a verification module 112 that verifies a performance metric 124 of shadow GNN models 122 against a target performance metric 126 associated with GNN model 115. Example system 100 may additionally include a security module 114 that performs a security action that protects against a potential security threat against GNN model 115 when performance metric 124 meets target performance metric 126.

In certain embodiments, one or more of modules 102 in FIG. 1 may represent one or more software applications or programs that, when executed by a computing device, may cause the computing device to perform one or more tasks.

Figure 2:
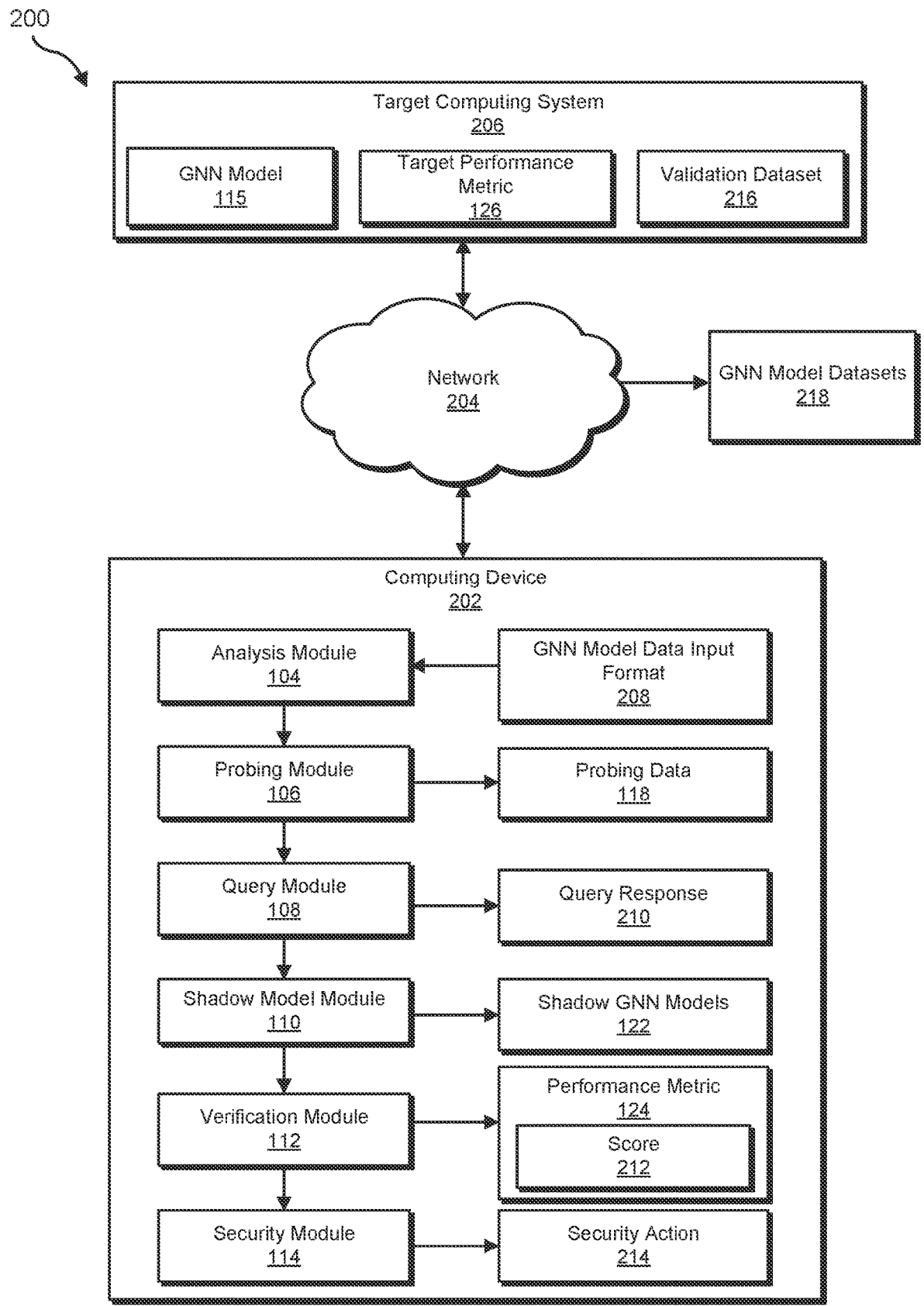
FIG. 2 is a block diagram of an additional example system for identifying and remediating security threats against graph neural network models.

For example, and as will be described in greater detail below, one or more of modules 102 may represent modules stored and configured to run on one or more computing devices, such as the devices illustrated in FIG. 2 (e.g., computing device 202 and/or target computing system 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate identifying and remediating security threats against graph neural network models. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include a data storage 120 for storing data. In one example, data storage 120 may store GNN model 115 (storing model data 116), probing data 118, shadow GNN models 122, performance metric 124, and target performance metric 126.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with target computing system 206 via a network 204. In one example, all or a portion of the functionality of modules 102 may be performed by computing device 202, target computing system 206, and/or any other suitable computing system. As will be described in greater detail below, one or more of modules 102 from FIG. 1 may, when executed by at least one processor of computing device 202 and/or target computing system 206, enable computing device 202 and/or target computing system 206 to identify and remediate security threats against graph neural network models.

For example, analysis module 104 may analyze GNN model data input format 208 utilized by GNN model 115 on target computing system 206. In some examples, and as will be described in greater detail herein, GNN model data for GNN model 115 may be obtained from GNN model datasets 218 (which may be a publicly accessible knowledgebase or other data sources). Next, probing module 106 may generate probing data 118 corresponding to GNN model data input format 208. Then, query module 108 may query GNN model 115 on target computing system 206 utilizing probing data 118. Next, shadow model module 110 may build, based on a query response 210 output of GNN model 115 utilizing probing data 118, one or more shadow GNN models 122. Then, verification module 112 may verify performance metric 124 for shadow GNN models 122 against target performance metric 126 associated with GNN model 115 on target computing system 206. In some examples (and as will be described in greater detail herein), verification module 112 may utilize a validation dataset 216 for evaluating a behavior of shadow GNN models 122 and assign a score 212 to shadow GNN models 122, based on a behavioral similarity of shadow GNN models 122 to GNN model 115 (i.e., the target model). Finally, security module 114 may perform a security action 214 that protects against a potential security threat against GNN model 115 when performance metric 124 meets target performance metric 126.

Computing device 202 generally represents any type or form of computing device capable of reading and/or executing computer-executable instructions. In some examples, computing device 202 may be a security server configured to run audit software for carrying out automated penetration testing of GNN services. Additional examples of computing device 202 include, without limitation, application servers, web servers, storage servers, and/or database servers configured to run certain software applications and/or provide various web, storage, and/or database services. Although illustrated as a single entity in FIG. 2, computing device 202 may include and/or represent a plurality of servers that work and/or operate in conjunction with one another.

Target computing system 206 generally represents any type or form of computing device that is capable of reading and/or executing computer-executable instructions. In some examples, target computing system 206 may be an application server configured to provide GNN services based on GNN models and associated model data. Additional examples of target computing system 206 include, without limitation, security servers, web servers, storage servers, and/or database servers configured to run certain software applications and/or provide various security, web, storage, and/or database services. Although illustrated as a single entity in FIG. 2, target computing system 206 may include and/or represent a plurality of servers that work and/or operate in conjunction with one another.

Network 204 generally represents any medium or architecture capable of facilitating communication or data transfer. In one example, network 204 may facilitate communication between computing device 202 and target computing system 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
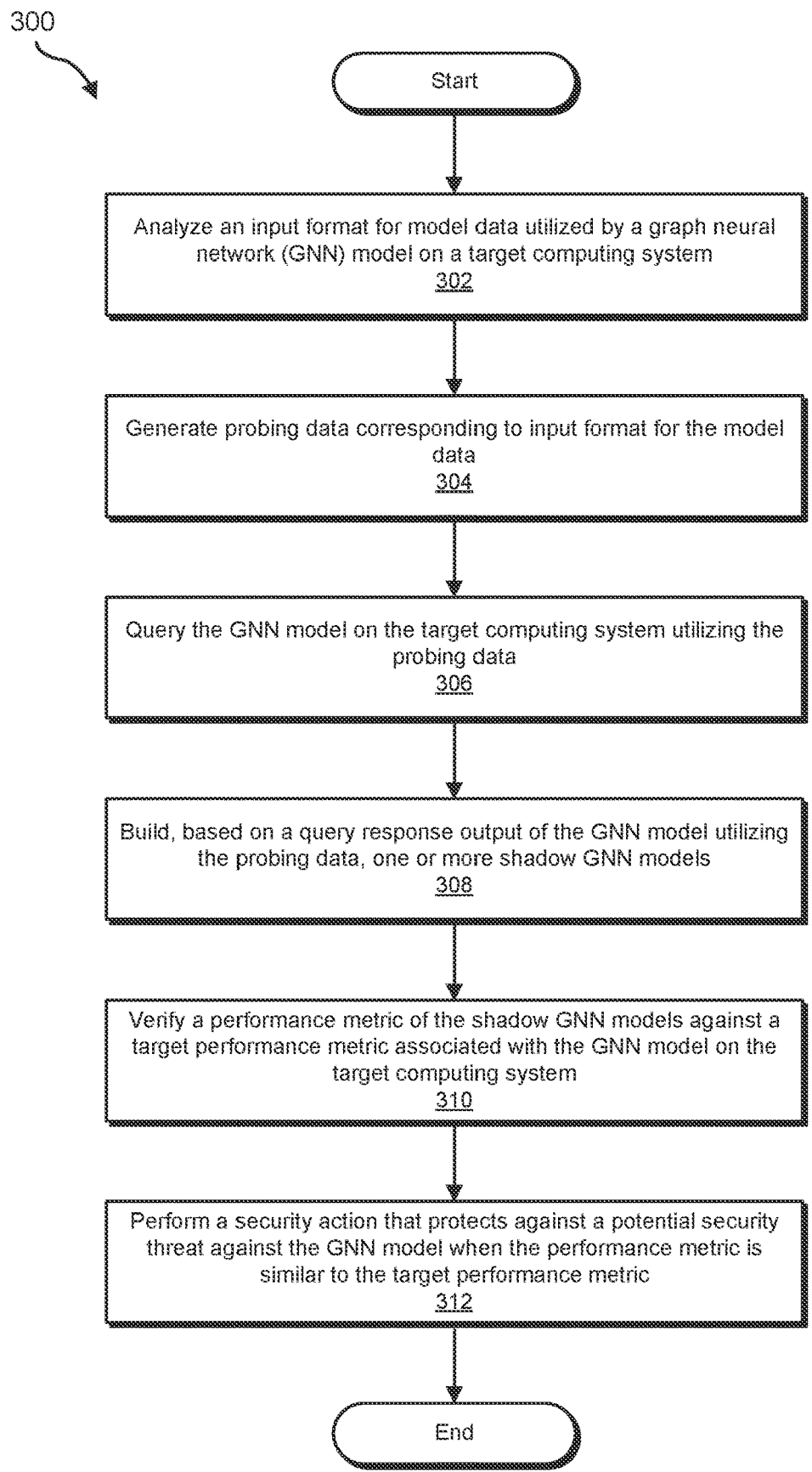
FIG. 3 is a flow diagram of an example method for identifying and remediating security threats against graph neural network models.

FIG. 3 is a flow diagram of an example computer-implemented method 300 for identifying and remediating security threats against graph neural network models. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may analyze an input format for model data utilized by a GNN model on a target computing system. For example, analysis module 104 may, as part of computing device 202, analyze GNN model data input format 208 utilized by GNN model 115 on target computing system 206.

Analysis module 104 may analyze GNN model data input format 208 in a variety of ways. In some examples, analysis module 104 may register as a user of target computing system 206. Then, analysis module may receive a data request from target computing system 206 for model data 116 (e.g., social media network data). Next, analysis module 104 may capture a format (i.e., the input format) of the data request.

At step 304 one or more of the systems described herein may generate probing data corresponding to input format for the model data. For example, probing module 106 may, as part of computing device 202, generate probing data 118 corresponding to GNN model data input format 208 for model data 116.

Probing module 106 may generate probing data 118 in a variety of ways. In some examples, probing module 106 may identify one or more datasets (e.g., GNN model datasets 218) in a data category (e.g., social network data) utilized by GNN model 115. Then probing module 106 may retrieving the identified datasets as probing data 118. In some examples, GNN model datasets 218 may represent publicly available data or data scraped from a network associated with GNN model 115. In other examples, GNN model datasets 218 may be data retrieved from a knowledgebase associated with probing module 106 that is similar to publicly available data utilized by GNN model 115.

At step 306 one or more of the systems described herein may query the GNN model on the target computing system utilizing the probing data. For example, query module 108 may, as part of computing device 202, query GNN model 115 on target computing system 206 utilizing probing data 118.

Query module 108 may query GNN model 115 in a variety of ways. In some examples, query module 108 may utilize an application programming interface (API) to retrieve a query graph including structural information associated with GNN model 115. Query module 108 may then query each of a group of nodes in the query graph utilizing probing data 118. Additionally or alternatively, query module 108 may retrieve unstructured graph node data utilized by GNN model 115. Then, query module 108 may build, based at least in part on the unstructured graph node data, a query graph comprising structural information associated with GNN model 115. Next, query module 108 may query each of a group of nodes in the query graph utilizing probing data 118. In some examples, query module 108 may retrieve the unstructured graph node data by performing web crawling or web scraping/data extraction on websites associated with target computing system 206. In some examples, query module 108 may build the query graph (i.e., a learned query graph) by learning a discrete graph structure from unstructured graph node data.

At step 308 one or more of the systems described herein may build, based on a query response output of the GNN model utilizing the probing data, one or more shadow GNN models. For example, shadow model module 110 may, as part of computing device 202, build, based on a query response 210 output of GNN model 115, shadow GNN models 122. In some examples, shadow GNN models 122 may be local GNN models intended to behave as surrogates (i.e., exhibit similar behavior) with respect to GNN model 115.

Shadow model module 110 may build shadow GNN models in a variety of ways. In some examples, shadow model module 110 may learn one or more surrogate GNN models from query response 210 output of GNN model 115 and then identify the surrogate GNN models as shadow GNN models 122.

At step 310 one or more of the systems described herein may verify a performance metric of the shadow GNN models against a target performance metric associated with the GNN model on the target computing system. For example, verification module 112 may, as part of computing device 202, verify performance metric 124 associated with shadow GNN models 122 against target performance metric 126 associated with GNN model 115 on target computing system 206.

Verification module 112 may verify performance metric 124 in a variety of ways. In some examples, verification module 112 may retrieve validation dataset 216 associated with target performance metric 126. In one embodiment, validation dataset 216 may include output data generated by GNN model 115 (i.e., the target model). Next, verification module 112 may utilize validation dataset 216 to perform an attack for evaluating GNN model 115 against shadow GNN models 122. In some examples, verification module 112 may perform a simulated model stealing attack against in which an adversary queries a target model (i.e., GNN model 115) via a remotely accessible API for learning a discrete graph structure from unstructured graph node data to generate a query graph utilized to make node-level queries of the target model and generate response data similar to data generated by the target model. Then, verification module 112 may compare, based on the attack, a behavior of GNN model 115 against a behavior of shadow GNN models 122. Next, verification module 112 may assign a score 212 to shadow GNN models based on the comparison. In some examples, score 212 may be based on a similarity of the behavior of shadow GNN models 122 with respect to GNN model 115 (i.e., the target model).

In some examples, score 212 may include a set of normalized values (e.g., values between 0 and 1) representing an accuracy and fidelity metrics with respect to the attack. In some examples, the accuracy metric may represent a number of correct predictions made divided by the total number of predictions with respect to the behavior of GNN model 115 by one or more shadow GNN models 122. In some examples, the fidelity metric may represent the number of predictions that are in agreement with respect to the behavior of both GNN model 115 and one or more shadow GNN models 122. In some examples, high scores assigned to the accuracy and fidelity metrics may be indicative of a close behavioral match between GNN model 115 and one or more shadow GNN models 122.

At step 312 one or more of the systems described herein may perform a security action that protects against a potential security threat against the GNN model when the performance metric is similar to the target performance metric. For example, security module 114 may, as part of computing device 202, perform a security action 214 that protects against a potential security threat against GNN model 115 when performance metric 124 (associated with one or more shadow GNN models 122) is similar to target performance metric 126 associated with GNN model 115. In some examples, performance metric 124 is similar to target performance metric 126 when one or more shadow GNN models 122 are assigned high scores (i.e., high accuracy and fidelity scores) by verification module 112.

Security module 114 may perform security action 214 in a variety of ways. In some examples, security module 114 may be configured to send a notification of the potential security threat to target computing system 206 when performance metric 124 is similar to target performance metric 126. Additionally or alternatively, security module 114 may be configured to perform remediation with respect to similar shadow GNN models 122 by adding random noise to a vector representing a query response output of GNN model 115 to degrade performance metric 124 of any similar shadow GNN models 122 (i.e., reduce the accuracy and fidelity metrics of similar shadow GNN models 122).

Figure 4:
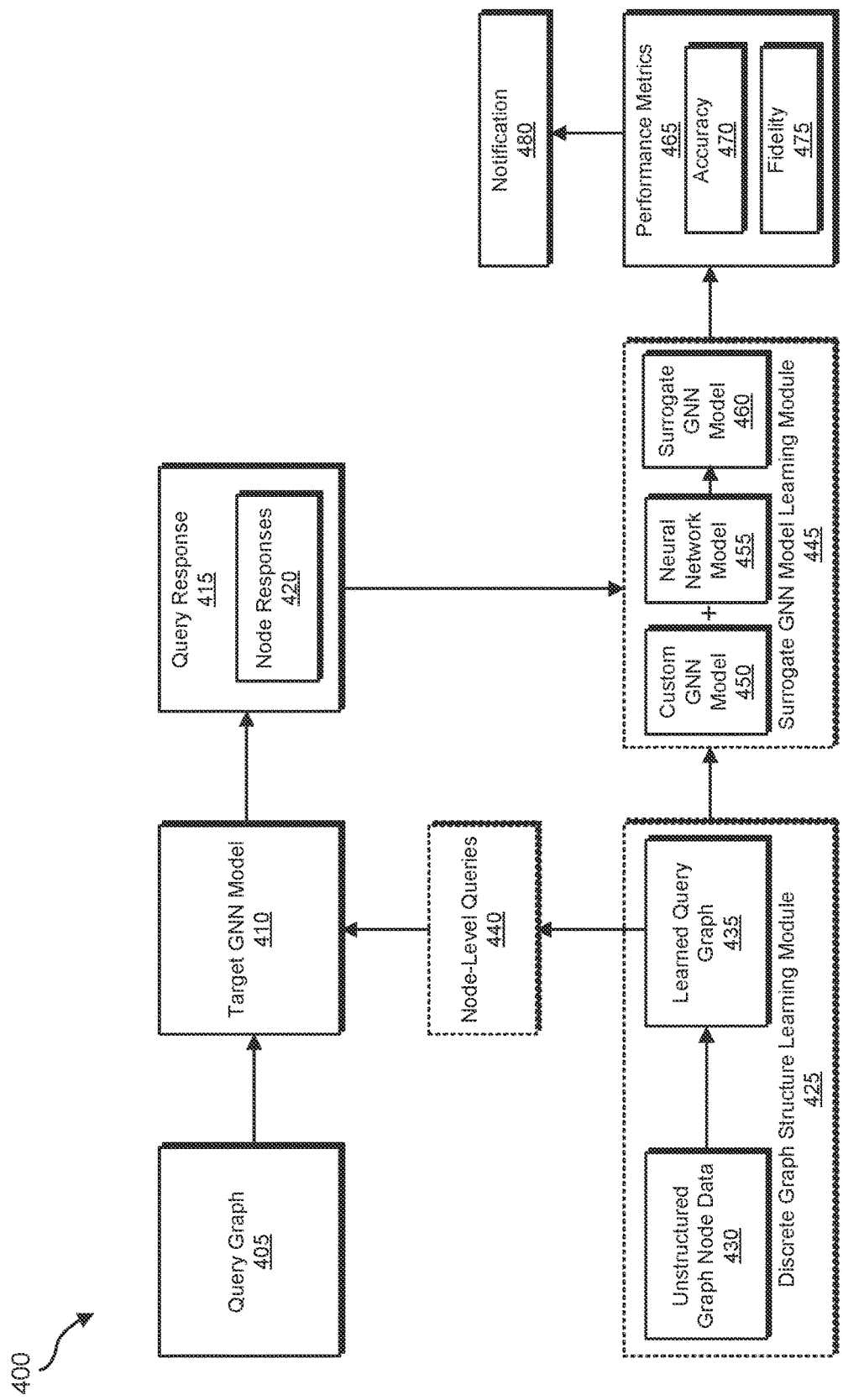
FIG. 4 is a block diagram of another example system for identifying and remediating security threats against graph neural network models.

FIG. 4 is a block diagram of another example system 400 for identifying and remediating security threats against graph neural network models. The system 400 includes a target GNN model 410 that receives, as an input, query graph 405, from which is generated query response 415 (including node responses 420).

System 400 also includes a discrete graph structure learning module 425 and surrogate GNN model learning module 445. In some examples, discrete graph structure learning module 425 and surrogate GNN model learning module 445 may be generated by a security server configured to run audit software for carrying out automated penetration testing of GNN services (i.e., target GNN model 410). Discrete graph structure learning module 425 may include unstructured graph node data 430 which may be utilized to generate a learned query graph 435 for making node-level queries 440 of target GNN model 410. Surrogate GNN model learning module 445 may include a custom GNN model 450 which, when paired with a neural network model 455, may be utilized to generate a surrogate GNN model 460 for testing against target GNN model 410. In some examples, surrogate GNN model 460 may receive node responses 420 for evaluating performance metrics 465, including accuracy 470 and fidelity 475, against target GNN model 410. Then, upon a finding of similar performance metrics 465, system 400 may generate a notification 480 (i.e., a potential security threat notification) for a user associated with target GNN model 410.

Figure 5:
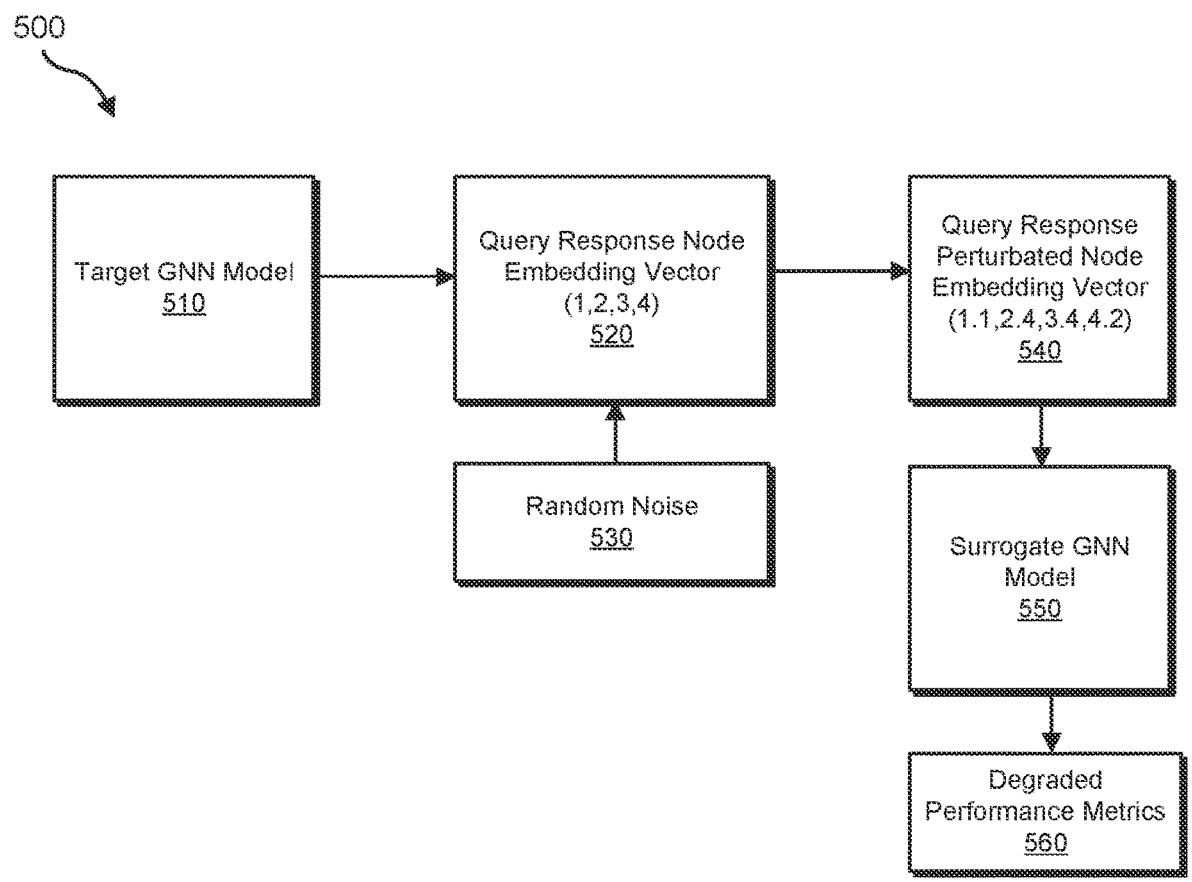
FIG. 5 is a block diagram of an example system for remediating security threats against graph neural network models.

FIG. 5 is a block diagram of an example system 500 for remediating security threats against graph neural network models. System 500 includes a target GNN model 510 that has as its output, a query response node embedding vector 520 (i.e., vector (1,2,3,4)). In some examples, system 500 may be configured to add random noise to query response node embedding vector 520 thereby creating a query response perturbated node embedding vector 540 (i.e., vector 1.1, 2.4, 3.4, 4.2).

In some embodiments, when query response perturbated node embedding vector 540 is received by a surrogate GNN model 550 created by a malicious actor, surrogate GNN model 550 would be affected by degraded performance metrics 560. Thus, any potential security threats associated with surrogate GNN model 550 behaving similarly to target GNN model 510 (e.g., model stealing) may be significantly reduced.

As explained above in connection with method 300 above, the systems and methods described herein may perform penetration testing of GNN services by actively probing targeted legitimate GNN services via a publicly accessible application programming interface (API) and building a local shadow GNN model that is intended to be behave as the GNN model utilized by the targeted services. By building shadow GNN models in this way, the systems and methods described herein may verify a shadow GNN model against a target GNN model for accuracy and fidelity (i.e., closeness) with respect to model behavior and, upon determining that the shadow model behaves closely with a target model, generate a notification for the owner of the target model identifying their model as vulnerable to attack (i.e., copied). Additionally, the systems and methods described herein may perform remediation of shadow model-based GNN service attacks by adding random noise to a GNN model vector to degrade the performance of shadow GNN models.

Figure 6:
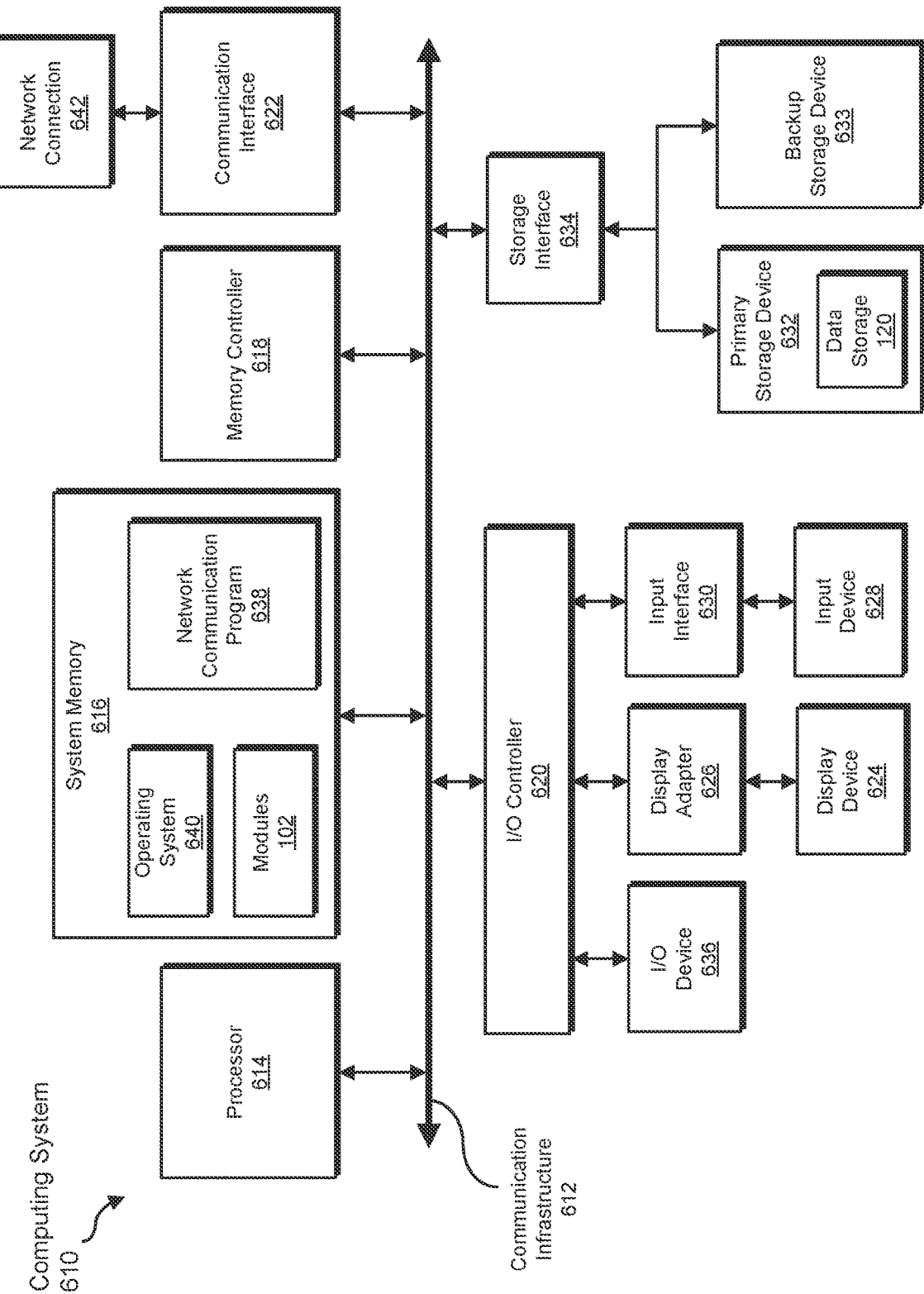
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In some examples, system memory 616 may store and/or load an operating system 640 for execution by processor 614. In one example, operating system 640 may include and/or represent software that manages computer hardware and software resources and/or provides common services to computer programs and/or applications on computing system 610. Examples of operating system 640 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 624 coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally or alternatively, example computing system 610 may include additional I/O devices. For example, example computing system 610 may include I/O device 636. In this example, I/O device 636 may include and/or represent a user interface that facilitates human interaction with computing system 610. Examples of I/O device 636 include, without limitation, a computer mouse, a keyboard, a monitor, a printer, a modem, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 638 for execution by processor 614. In one example, network communication program 638 may include and/or represent software that enables computing system 610 to establish a network connection 642 with another computing system (not illustrated in FIG. 6) and/or communicate with the other computing system by way of communication interface 622. In this example, network communication program 638 may direct the flow of outgoing traffic that is sent to the other computing system via network connection 642. Additionally or alternatively, network communication program 638 may direct the processing of incoming traffic that is received from the other computing system via network connection 642 in connection with processor 614.

Although not illustrated in this way in FIG. 6, network communication program 638 may alternatively be stored and/or loaded in communication interface 622. For example, network communication program 638 may include and/or represent at least a portion of software and/or firmware that is executed by a processor and/or Application Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, data storage 120 from FIG. 1 may be stored and/or loaded in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an Application Specific Integrated Circuit (ASIC) adapted to implement one or more of the example embodiments disclosed herein.

Figure 7:
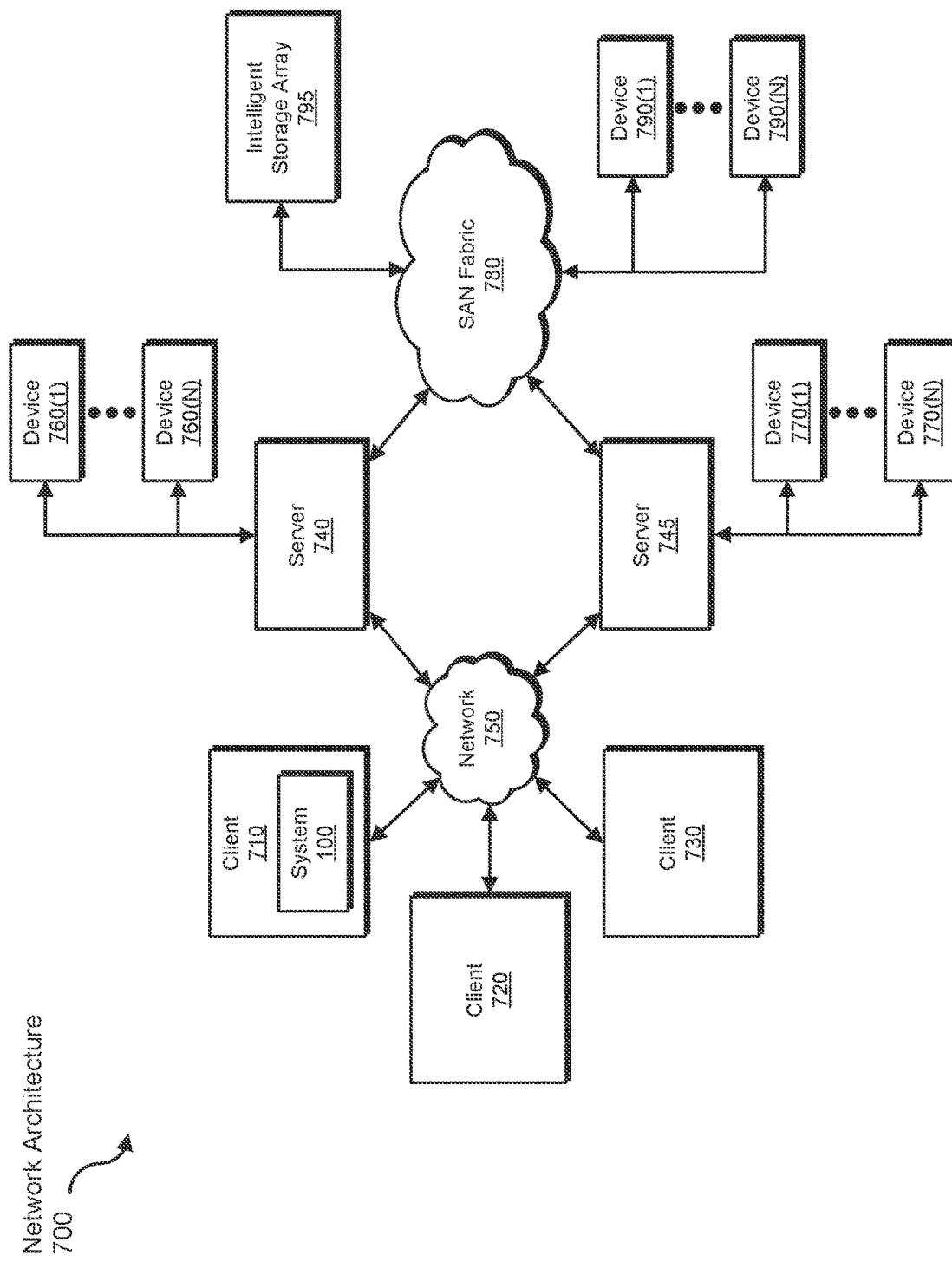
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the present disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for identifying and remediating security threats against graph neural network models.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for identifying and remediating security threats against graph neural network models, at least a portion of the method being performed by one or more computing devices comprising at least one processor, the method comprising:
    analyzing, by the one or more computing devices, an input format for model data utilized by a graph neural network (GNN) model on a target computing system;
    generating, by the one or more computing devices, probing data corresponding to input format for the model data;
    querying, by the one or more computing devices, the GNN model on the target computing system utilizing the probing data;
    building, by the one or more computing devices and based on a query response output of the GNN model utilizing the probing data, one or more shadow GNN models;
    verifying, by the one or more computing devices, a performance metric of the shadow GNN models against a target performance metric associated with the GNN model on the target computing system; and
    performing, by the one or more computing devices, a security action that protects against a potential security threat against the GNN model on the target computing system when the performance metric of the shadow GNN models is similar to target performance metric associated with the GNN model.

2. The computer-implemented method of claim 1, wherein analyzing the input format for the model data utilized by the GNN model on the target computing system comprises:
    registering as a user of the target computing system;
    receiving a data request from the target computing system for the model data; and
    capturing a format of the data request.

3. The computer-implemented method of claim 1, wherein generating the probing data comprises:
    identifying one or more datasets in a data category utilized by the GNN model; and
    retrieving the identified datasets as the probing data.

4. The computer-implemented method of claim 1, wherein querying the GNN model comprises:
    utilizing an application programming interface (API) to retrieve a query graph comprising structural information associated with the GNN model on the target computing system; and
    querying each of a group of nodes in the query graph utilizing the probing data.

5. The computer-implemented method of claim 1, wherein querying the GNN model comprises:
    retrieving unstructured graph node data utilized by the GNN model on the target computing system;
    building, based at least in part on the unstructured graph node data, a query graph comprising structural information associated with the GNN model; and
    querying each of a group of nodes in the query graph utilizing the probing data.

6. The computer-implemented method of claim 1, wherein building the shadow GNN models comprises:
    learning one or more surrogate GNN models from the query response output of the GNN model; and
    identifying the surrogate GNN models as the shadow GNN models.

7. The computer-implemented method of claim 1, wherein verifying the performance metric of the shadow GNN models against the target performance metric associated with the GNN model on the target computing system comprises:
    retrieving a validation dataset associated with the target performance metric;
    utilizing the validation dataset to perform an attack for evaluating the GNN model and the shadow GNN models;
    comparing, based on the attack, a behavior of the GNN model against a behavior of the shadow GNN models; and
    assigning a score to the shadow GNN models based on the comparison, wherein the score is based on a similarity of the behavior of the shadow GNN models to the GNN model.

8. The computer-implemented method of claim 7, wherein the score comprises a set of normalized values representing an accuracy and a fidelity of the attack for evaluating the GNN model and the shadow GNN models.

9. The computer-implemented method of claim 1, wherein performing the security action comprises adding random noise to a vector representing the query response output of the GNN model to degrade the performance metric of the shadow GNN models below a level associated with the target performance metric.

10. The computer-implemented method of claim 1, wherein performing the security action comprises sending a notification of the potential security threat to the target computing system.

11. A system for identifying and remediating security threats against graph neural network models, the system comprising:
- at least one physical processor;
- physical memory comprising computer-executable instructions and one or more modules that, when executed by the physical processor, cause the physical processor to:
  - analyze, by an analysis module, an input format for model data utilized by a graph neural network (GNN) model on a target computing system;
  - generate, by a probing module, probing data corresponding to the input format for the model data;
  - query, by a query module, the GNN model on the target computing system utilizing the probing data;
  - build, by a shadow model module and based on a query response output of the GNN model utilizing the probing data, one or more shadow GNN models;
  - verify, by a verification module, a performance metric of the shadow GNN models against a target performance metric associated with the GNN model on the target computing system; and
  - perform, by a security module, a security action that protects against a potential security threat against the GNN model on the target computing system when the performance metric of the shadow GNN models is similar to target performance metric associated with the GNN model.

12. The system of claim 11, wherein the analysis module analyzes the input format for the model data utilized by the GNN model on the target computing system by:
- registering as a user of the target computing system;
- receiving a data request from the target computing system for the model data; and
- capturing a format of the data request.

13. The system of claim 11, wherein the probing module generates the probing data by:
- identifying one or more datasets (social network data) in a data category utilized by the GNN model; and
- retrieving the identified datasets as the probing data.

14. The system of claim 11, wherein the query module queries the GNN model by:
- utilizing an application programming interface (API) to retrieve a query graph comprising structural information associated with the GNN model on the target computing system; and
- querying each of a group of nodes in the query graph utilizing the probing data.

15. The system of claim 11, wherein the query module queries the GNN model by:
- retrieving unstructured graph node data utilized by the GNN model on the target computing system;
- building, based at least in part on the unstructured graph node data, a query graph comprising structural information associated with the GNN model; and
- querying each of a group of nodes in the query graph utilizing the probing data.

16. The system of claim 11, wherein the shadow model module builds the shadow GNN models by:
- learning one or more surrogate GNN models from the query response output of the GNN model; and
- identifying the surrogate GNN models as the shadow GNN models.

17. The system of claim 11, wherein the verification module verifies the performance metric of the shadow GNN models against the target performance metric associated with the GNN model on the target computing system by:
- retrieving a validation dataset associated with the target performance metric;
- utilizing the validation dataset to perform an attack for evaluating the GNN model and the shadow GNN models;
- comparing, based on the attack, a behavior of the GNN model against a behavior of the shadow GNN models; and
- assigning a score to the shadow GNN models based on the comparison, wherein the score is based on a similarity of the behavior of the shadow GNN models to the GNN model.

18. The system of claim 17, wherein the score comprises a set of normalized values representing an accuracy and a fidelity of the attack for evaluating the GNN model and the shadow GNN models.

19. The system of claim 11, wherein performing the security action comprises adding random noise to a vector representing the query response output of the GNN model to degrade the performance metric of the shadow GNN models below a level associated with the target performance metric.

20. A non-transitory computer-readable medium comprising one or more computer-executable instructions that, when executed by at least one processor of a computing device, cause the computing device to:
- analyze an input format for model data utilized by a graph neural network (GNN) model on a target computing system;
- generate probing data corresponding to the input format for the model data;
- query the GNN model on the target computing system utilizing the probing data;
- build, based on a query response output of the GNN model utilizing the probing data, one or more shadow GNN models;
- verify a performance metric of the shadow GNN models against a target performance metric associated with the GNN model on the target computing system; and
- perform a security action that protects against a potential security threat against the GNN model on the target computing system when the performance metric of the shadow GNN models is similar to target performance metric associated with the GNN model.

* * * * *